United States Patent Office 3,301,216
Patented Jan. 31, 1967

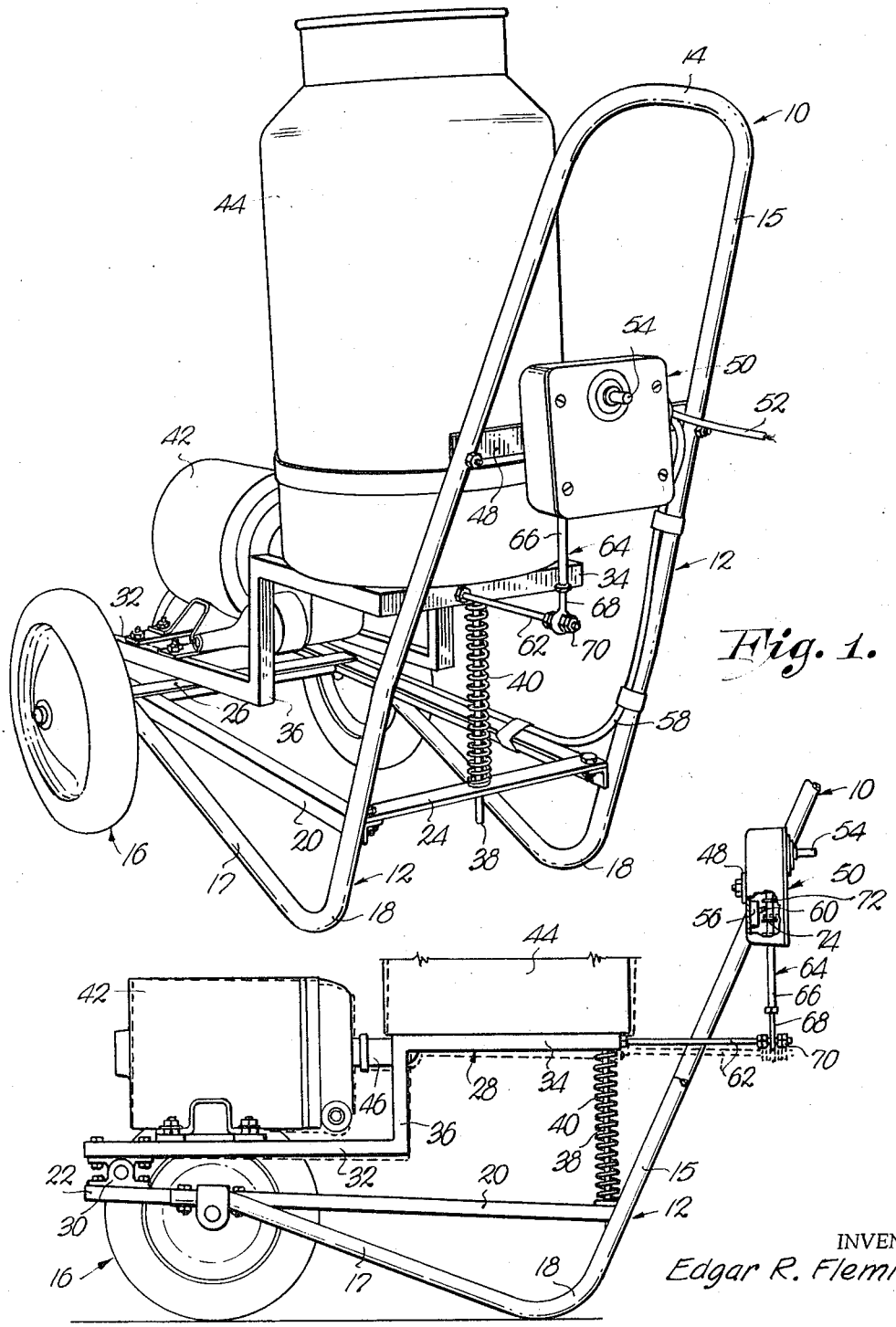

3,301,216
AUTOMATIC MILK TRANSFER ASSEMBLY
Edgar R. Fleming, 3105 Chess, Parsons, Kans. 67357
Filed Feb. 1, 1966, Ser. No. 524,157
5 Claims. (Cl. 119—14.08)

This invention relates to diary apparatus and, more particularly, to a milk transfer assembly for automatically delivering milk from cows to a bulk storage tank.

It is conventional practice in dairies to use vacuum apparatus for automatically milking the cows, with the milk being delivered to intermediate reservoir cans which are subsequently emptied by pumping mechanism for conveyance of the milk to a bulk storage tank at a remote location. Normally, the pump delivering milk from the reservoir can to the bulk storage tank is operating full time at a predetermined, relatively high rate to assure adequate accommodation of peak milking conditions, particularly at the beginning of the milking operation. However, there often will be insufficient milk received from the cows to keep a constant supply of milk in the reservoir cans, all to the end that the pumping operation will continue needlessly and consequently shorten the usfeul life of the pump while also wastefully consuming costly power.

Accordingly, it is the primary object of the present invention to provide a milk transfer assembly which is adapted to receive milk taken from cows by an automatic milking machine and then pumping the milk to a bulk storage tank as outlined above, the apparatus having automatic intermittent pumping operation corresponding to the weight of the milk being received by the can so that the pump is operating only when there is a predetermined supply of milk in the reservoir can, thereby eliminating the costly and wasteful pumping procedures heretofore utilized.

A more particular object of this invention is to provide a milk transfer assembly of the aforementioned character wherein the reservoir can is shiftably and yieldably mounted on a frame whereby it shifts vertical in selective response to the instantaneous weight of milk in the can, there being switch means actuated by the can when the latter has received a predetermined weight of milk to start the pump and thereby convey the milk from the can to the bulk storage tank. When the weight of the milk in the can reaches a predetermined lower weight, such as near zero, the switch is deactuated to discontinue the pumping operation until a sufficient supply of milk is again contained within the reservoir can.

Another object of the instant invention is to provide an automatic milk transfer apparatus which is compact and highly mobile to facilitate use of the assembly throughout the dairy.

Other objects include details of construction which will become apparent from the following specification and accompanying drawing, wherein:

FIGURE 1 is a rear perspective view of an assembly made pursuant to the teachings of my invention; and FIG. 2 is a fragmentary, side elevational view thereof, parts being broken away and in section to reveal details of construction.

In the present invention, there is provided a tubular frame 10 including a pair of space-apart, L-shaped side member 12 having generally vertical legs 15 terminating at the upper most ends thereof in an intergral continous handle 14. A wheel and axle assembly 16 is secured to the forwardmost portions of the generally horizontal legs 17 of side members 12, with the latter being inclined for normally resting on the bight portions 18 thereof.

Each side member 12 is provided with a horizontal angle brace 20 interconnecting respective legs 15 and 17 and extending beyond wheel and axle assembly 16 to define a pair of spaced support arms 22. A cross member 24 interconnects angle braces 20 at the rear ends thereof between legs 15, while a similar cross member 26 interconnects angle braces 20 adjacent the wheel and axle assembly 16.

A platform 28 is pivotally secured at its forwardmost end to support arms 22 by the hinge means 30. Platform 28 includes a lower shelf 32 and an upper shelf 34 interconnected by a pair of integral, vertical elements 36. A vertical rod 38 is rigidly secured to the rear edge of upper shelf 34 and depends therefrom to extend through an opening provided in cross member 24. A weight-responsive balancing element in the form of a coil spring 40 is telescoped over rod 38 and interposed between upper shelf 34 and cross member 24 to normally yieldably dispose platform 28 in the upper operating position indicated by the full-line portions in FIG. 2. A fluid pump 42 is mounted on lower shelf 32, and a reservoir can 44 is carried on upper shelf 34, there being an interconnecting hose 46 coupling pump 42 and can 44.

A horizontal bracket 48 is bolted between legs 15 intermediate the ends of the latter and carries a switching box 50. Electrical current is fed to switching box 50 by a power line 52 which is connected through a push button switch 54 to the switch unit 56. Current is directed from switch unit 56 to the electrically operated pump 42 by a lead 58, the current through lead 58 being controlled by the On-Off arm 60 which extends laterally from switch unit 56 and is shiftable between upper and lower operating positions.

A rearwardly extending rod 62 is secured to the rear edge of upper shelf 34, there being a vertical rod 64 extending upwardly from rod 62 and terminating within switching box 50. Rod 64 comprises a pair of relatively telescope, threaded sections 66 and 68, the lower section 68 being looped about rod 62 and held thereon by opposed nuts 70. Upper section 66 has a pair of circular, lateral projections 72 and 74 respectively disposed above and below arm 60.

In operation, automatic milking apparatus (not shown) is coupled to reservoir can 44 for delivering milk thereinto. Push button switch 54 is operated to permit current flow from power line 52 to switch unit 56, but current will not flow through the latter to actuate pump 42 since arm 60 is disposed in its upper operating position corresponding to the solid-line portions of FIG. 2. As milk is delivered to reservoir can 44 from the automatic milking apparatus, the added weight of the milk will cause platform 28 and can 44 carried thereby, to shift or swing downwardly against the resistance of spring 40, rod 38 being freely slidable with respect to cross member 24.

Assuming that the solid-line portions of FIG. 2 represent an initially empty reservoir can 44, the platform 28 will swing downwardly about hinge means 30 from an upper position in response to the weight of the milk contained in can 44, to a lower operating position corresponding to the broken-line showing in FIG. 2. Simultaneously, rod 64 moves downwardly with platform 28 and upon reaching the broken-line position of FIG. 2, upper projection 72 will have been moved sufficiently downwardly to shift arm 60 from its upper to its lower operating position to thereby actuate switch unit 56. This actuation of switch unit 56 causes current to flow through lead 58 to operate pump 42 whereby milk will be pumped from reservoir can 44 to a bulk storage tank (not shown), the pumping operation continuing until a predetermined amount of milk has been removed from the can 44, during which time the platform 28 and can 44 swing upwardly to the upper position thereof. As the upper position of platform 28 is reached, projection 74 on rod 64 will urge arm 60 into its corresponding upper position to deactivate switch unit 56 and thereby stop pump 42. As is apparent, pump 42 will not be restarted until can 44 has again been filled with sufficient milk to shift to its lower position.

Various components of the assembly can be adjusted to achieve the desired operation thereof and the delivery of a predetermined amount of milk from can 44 to a bulk tank. These include the strength of spring 40; the capacity of pump 42; and the relative positions of projections 72 and 74, adjusted by rotating section 66 of rod 64. When the assembly is directly connected with the milking apparatus, as hereinabove described, suitable means are provided to maintain the necessary vacuum between can 44 and the milking apparatus. In another manner of use, however, milk may be directly poured into the can 44 and when the predetermined amount of milk by weight has been poured into the can 44, the assembly will operate in the manner hereinabove described.

Having thus described the invention, what is claimed as new and desired to be secured by Letters Patent is:

1. A milk transfer assembly adapted for use with a fluid pump, said assembly comprising:
   a frame;
   a milk-receiving can having an outlet means connected to said pump;
   shiftable means mounting said can on said frame;
   a weight-responsive element coupled to said mounting means to normally yieldably dispose the same in an upper position, the means being shiftable to a lower position against the resistance of said element in response to a predetermined weight of milk in the can; and
   a switch unit for operating the pump, said switch unit being operably coupled to said shiftable means and actuated thereby to start the pump and remove the milk from the can when said means has shifted to its lower position, the switch unit including mechanism operably coupled to said means for deactivation of the unit to stop the pump upon reshifting of the means to its upper position in response to the removal of milk from the can.

2. The invention of claim 1, said mounting means comprising a platform pivotally secured to said frame for vertical shifting movement, said can being carried by said platform.

3. The invention of claim 2, said element comprising biasing means disposed between said platform and said frame.

4. The invention of claim 3, said frame including a cross member below said platform, said biasing means comprising a coil spring interposed between said platform and member.

5. The invention of claim 4, said switch unit including a laterally extending, shiftable arm having an upper and lower operating position for deactivation and activation, respectively, there being a vertical rod joined to said platform for movement therewith, said rod having a pair of lateral projections disposed above and below said arm to shift the same to its operating positions corresponding to the position of the platform.

References Cited by the Examiner

UNITED STATES PATENTS

| | | | |
|---|---|---|---|
| 2,009,400 | 7/1935 | Hapgood | 119—14.06 X |
| 2,361,970 | 11/1944 | Schmitt | 119—14.11 |
| 2,619,906 | 12/1952 | Gardenhour | 103—25 |
| 2,720,837 | 10/1955 | Reeve | 119—14.08 |
| 2,895,450 | 7/1959 | Hope | 119—14.11 |
| 2,952,209 | 9/1960 | Scholin | 222—66 |
| 3,198,122 | 8/1965 | Lippke et al. | 103—25 |
| 3,224,460 | 12/1965 | Cann | 137—399 |

SAMUEL KOREN, *Primary Examiner.*

ALDRICH F. MEDBERY, *Examiner.*